(12) United States Patent
Shinohara et al.

(10) Patent No.: US 6,605,178 B1
(45) Date of Patent: Aug. 12, 2003

(54) ULTRASONIC SEALER

(75) Inventors: Mitsuhiko Shinohara, Tarohachisu (JP); Takeshi Iseki, Tarohachisu (JP); Michio Ueda, Tarohachisu (JP); Satoshi Kume, Tarohachisu (JP); Osamu Tamamoto, Atsugi (JP); Tadayoshi Hamaguchi, Atsugi (JP)

(73) Assignee: Shikoku Kakoki Co., Ltd., Tokushima (JP)

( * ) Notice: Subject to any disclaimer, the term of this patent is extended or adjusted under 35 U.S.C. 154(b) by 0 days.

(21) Appl. No.: 09/646,806

(22) PCT Filed: Mar. 23, 1999

(86) PCT No.: PCT/JP99/01428

§ 371 (c)(1),
(2), (4) Date: Sep. 22, 2000

(87) PCT Pub. No.: WO99/48759

PCT Pub. Date: Sep. 30, 1999

(30) Foreign Application Priority Data

Mar. 23, 1998 (JP) .............................. 10-092270

(51) Int. Cl.⁷ .............................................. B65B 51/10
(52) U.S. Cl. ................ 156/379.6; 156/580.2; 310/323.19; 310/348; 228/1.1
(58) Field of Search ............... 156/73.1, 73.4, 156/379.6, 580.1, 580.2; 310/323.19, 348; 228/1.1

(56) References Cited

U.S. PATENT DOCUMENTS

| 3,254,402 A | 6/1966 | Arthur et al. | |
| 3,562,041 A | 2/1971 | Robertson | |
| 3,681,176 A | 8/1972 | Reifenhauser et al. | |
| 4,483,571 A | * 11/1984 | Mishiro | 310/323.19 |
| 4,607,185 A | * 8/1986 | Elbert et al. | 310/323.19 |
| 4,995,938 A | * 2/1991 | Tsutsumi | 156/580.1 |
| 5,171,387 A | 12/1992 | Wuchinich | |
| 5,360,498 A | * 11/1994 | Blomqvist et al. | 156/73.1 |
| 5,730,351 A | 3/1998 | Hermann | |
| 5,800,671 A | * 9/1998 | R.ang.be | 156/580.1 |
| 5,828,156 A | * 10/1998 | Roberts | 310/317 |
| 6,153,964 A | * 11/2000 | Olsson et al. | 310/323.18 |

FOREIGN PATENT DOCUMENTS

| JP | 56-92046 | 7/1981 |
| JP | 62-22784 | 5/1987 |
| JP | 62-501543 | 6/1987 |
| JP | 63-147408 | 9/1988 |
| JP | 1-23368 | 5/1989 |
| JP | 6-15741 | 1/1994 |
| JP | 7-2231 | 1/1995 |
| JP | 7-33121 | 2/1995 |
| JP | 2544450 | 7/1996 |
| JP | 9-2430 | 1/1997 |
| JP | 9-103740 | 4/1997 |
| JP | 9-122588 | 5/1997 |
| JP | 10-128237 | 5/1998 |

\* cited by examiner

*Primary Examiner*—Michael W. Ball
*Assistant Examiner*—John T. Haran
(74) *Attorney, Agent, or Firm*—Venable LLP; Robert Kinberg

(57) ABSTRACT

An ultrasonic sealing apparatus comprises at least one horn having an elongated sealing face for sealing a packing material. Plural converters are erected on a side of the horn opposite to the sealing face for resonating the horn with a vibrating frequency. The ultrasonic sealing apparatus has a length that is one wavelength of the vibrating frequency and is fixed in position to a sealing jaw at a nodal plane of the vibrating frequency.

23 Claims, 6 Drawing Sheets

ULTRASONIC SEALER

BACKGROUND OF THE INVENTION

1. Technical Field

The present invention relates to an ultrasonic sealing apparatus provided with an elongated sealing face for sealing a packing material, specifically a tubular packing material filled with content such as a liquid beverage, and more particularly to an ultrasonic sealing apparatus having at least one horn and plural converters and to a transverse sealing apparatus provided with the ultrasonic sealing apparatus.

2. Background Art

Hitherto, there has been known a packing machine in which a sterilized packing material web is used for a rectangular parallelepiped packing container filled with juice, etc. as shown in FIG. 1 see also (Japanese Patent Publication No. 23368/1989). In brief, the filling/packing machine as a whole comprises a reel 2 supporting a packing material web 1 in a rolled state, a sterilization, device 3 for sterilizing the tabular packing material web successively unwound from the reel 2, a longitudinal sealing section 4 for sealing the longitudinal edges of the sterilized packing material web and thereby forming a tubular packing material web, a liquid supply tube 5 for filling a fluid content into the tubular form, a transverse sealing device 7 for sealing the tubular packing material web in a direction perpendicular to the longitudinal direction thereof while feeding downward the tube filled with the content by a length substantially corresponding to one container and, at the same time, continuously forming pillow-shaped containers 6 which are rectangle in section, and a container shaping device 8 for forming the pillow-shaped containers 6 into rectangular parallelepiped containers which are the final form by folding its end portions. The above-mentioned transverse sealing device 7 is composed of a sealing unit, a sealing jaw for fixing the said sealing unit, and a driving means for driving the said sealing jaw.

The following ultrasonic sealing apparatuses are known.

Japanese Laid-Open Patent Application No. 2231/1995 discloses an ultrasonic sealing apparatus which comprises a piezoelectric driving unit having a piezoelectric ceramic plate or a magnetostriction driving unit, which is connected to an AC supply source, and a horn having an elongated sealing surface, and which is further characterized with one or more reaction bodies forming a half wavelength together with the horn.

Japanese Patent Publication No. 22784/1987 discloses an ultrasonic welding apparatus for a container body comprising a longitudinal groove on the center line of a butting face which has a substantially rectangular form in a side sealing portion of an ultrasonic welding horn, wherein the horn includes steps with small differences provided toward the center of both side faces of the longitudinal groove for side sealing by ultrasound a container body of card board laminated with plastic film.

Japanese Patent Publication No. 2544450 discloses a hermetic sealing method for sealing a paper container for liquid characterized in that the method for sealing the open end portions of a container having a thermoplastic layer on its paper surface comprises sealing the upper and lower portions of the tubular body by affixing each end portion of one sheet, whereby an entire face of the open end to be sealed is simultaneously heated in an oven and subsequently preparatively sealed by applying pressure, and finally ultrasonically sealed.

Japanese Model Laid-Open Application No. 147408/1988 discloses an ultrasonic sealing apparatus for liquid containers, wherein a band-shaped ridge is provided nearly at the center of a face of the horn butting against a portion to be sealed, a concave groove perpendicular to the ridge is provided nearly at the center of a face of the anvil butting against the portion to be sealed, a bottom portion of the concave groove is made into a two-step structure and its step portion and both end portions are tapered, and an acute-shaped protruded slant face extending sideward is provided at an end portion of the center of the bottom portion on the ultrasonic sealing apparatus for sealing upper and lower open end portions of a tubular liquid container, which is rectangular in section, having an overlapping bonded portion nearly at a center of a body consisting of a horn and an anvil.

Japanese Laid-Open Patent Application No. 501543/1987 corresponding to (PCT/US85/02564) discloses an ultrasonic horn apparatus used for dissolving reagent tablets in a cuvette, comprising a horn body, which is generally a rectangular horn body, having a front end face and a rear end face, for transmitting acoustic waves substantially at a right angle to the front end face to interact with a content in the cuvette which moves in the vicinity of the front end face, in response to vibrations applied to the rear end face, a converter means fixed to the rear end face of the horn body at the center position in the direction of the width of the rear end face for applying the vibrations to the horn body in response to electrical energy supplied to the converter means, and a pair of resonating members each having an acoustic length equal to a half wave length of the acoustic waves transmitted from the horn body and fixed to the end regions in the direction of width of the rear end face and extending at a right angle from the rear end face, for causing acoustic waves transmitted nearly at a right angle from the front end face to propagate at a nearly uniform amplitude along the direction of width of the front end face, wherein the content in the cuvette moving along the direction of width of the front end face at a certain distance from the front end face is subjected to nearly uniform acoustic waves.

Japanese Laid-Open Patent Application No. 33121/1995 discloses a sealing apparatus for packing containers comprising an anvil supporting packing materials for the packing containers on whose surface a sealant layer is formed, a horn transmitting ultrasonic vibrations to packing materials by applying pressure pressing the packing materials against the anvil, and an ultrasonic vibration absorbing means provided between, the tip end of the horn and the edge portion of the packing material, so that the horn transmits the ultrasonic vibration to the packing materials, and is able to weld sealant layers to each other, while preventing a side of the edge portion of the packing materials from being excited, and accordingly preventing dust from occurring at the end surfaces of the paper substrates exposed at the edge portions of the packing materials.

Japanese Laid-Open Patent Application No. 92046/1981 discloses an ultrasonic sealing machine comprising an ultrasonic welding apparatus for a container body comprising a horn including steps at one side edge of a sealing face facing the sealing portion of the horn, wherein the steps are open at the portions corresponding to the vicinity of the top end of the sealing portion for side sealing paper containers of a plastic film laminate and the like.

Japanese Laid-Open Patent Application No. 15741/1994 discloses an ultrasonic sealing apparatus for manufacturing packing containers from thermoplastic materials, comprising a giant magnetostrictive powder composite (GMPC)

made of magnetostrictive materials, and wherein the vibration generator is wound around by a coil generating a magnetic field and secured on to a sealing jaw, and has a cross sectional area which progressively reduces when seen from an anchorage point against the jaw, and a free face of an end portion is provided on a narrow surface.

U.S. Pat. No. 5,730,351 discloses a device for ultrasonic treatment of a workpiece, the device comprising a horn (sonotrode) having a first side and a second side both contacting the workpiece; and a drive unit for the horn, whereby the drive unit includes first and second ultrasound oscillating units, and first and second connecting means arranged spaced apart for individually connecting the first and second oscillation units respectively to said second face of the horn.

Japanese Laid-Open Patent Application No. 128237/1998 discloses an ultrasonic apparatus for supplying vibratory energy in the ultrasonic frequency range to a workpiece, the ultrasonic apparatus comprising a horn whose dimension is set to mechanically resonate at a predetermined frequency in the ultrasonic frequency range, plural to piezoelectric transducers coupled to the horn for causing the horn to resonate at said predetermined frequency, a power supply connected to the transducers for providing electrical energy at the predetermined frequency to said transducers and causing said transducers to be energized in parallel, and a means for balancing the electrical current flow through the transducers coupled to the circuit between the power supply and each transducer.

At present, a packing material comprising a laminate of paper, aluminum foil and thermoplastic is mainly used for one-use disposable packing containers having a rectangular parallelpiped shape filled with a liquid such as juice and closed in a sealed manner. In the future it is considered that a packing container using a packing material comprising a laminate of thermoplastic having no aluminum foil will be the mainstream, since recycling treatment of packing material laminate including aluminum foil is considered difficult after containers are disposed. However, for heat sealing a packing material comprising a laminate of thermoplastic including no aluminum foil, a heat sealing apparatus using a high-frequency coil which has been used with packing materials including aluminum foil cannot be applied, so it is necessary to use other heat sealing apparatuses such as an ultrasonic sealing apparatus, for example.

Generally, an ultrasonic sealing apparatus includes a converter, a booster and a horn. The electrical vibration is converted into mechanical vibration by a converter, and the booster is used to fix the apparatus mechanically and to amplify the amplitude of the vibration. The horn further amplifies the amplitude so that the desired sealing surface is formed. However, the ultrasonic sealing apparatuses, which have well-known properties and which have been generally used, require a larger space for the apparatus when enhancing the heat sealing ability and there is a drawback that such apparatus cannot be set on a sealing jaw of a transverse sealing apparatus of the filling/packing machine. For practical use, there is a need for an ultrasonic sealing apparatus capable of outputting high power while occupying a much smaller space, and which can be applied to a transverse sealing apparatus.

Additionally, uniformly heat sealing the elongated entire face at both end portions has been considered difficult with the known ultrasonic apparatuses used for a sealing jaw of the transverse sealing apparatus of a filling/packing machine, because one converter is used and the dimension of the motional amplitude at the sealing face of the horn (output surface) reduces with increasing lateral distance away from the central area where the converter is coupled to the horn.

SUMMARY OF THE INVENTION

An object of the present invention is to provide an ultrasonic sealing apparatus which can be set on a sealing jaw of a transverse sealing apparatus of a filling/packing machine for effecting a transverse sealing of an appropriate length, and in particular an elongated uniform heat sealing, and wherein the ultrasonic sealing apparatus is compact and able to output larger power.

The inventors of the present invention have made a keen investigation and have solved the above object by provision of an ultrasonic sealing apparatus comprising one horn having an elongated sealing face for sealing a packing material and plural converters erected on the horn, and one or more fixtures provided parallel to the converter, wherein the fixing position at the fixture of the ultrasonic sealing apparatus and the sealing jaw is a nodal plane farther (i.e. remote) from the sealing face. According to a further aspect of the invention, there is provided an ultrasonic sealing apparatus comprising one horn and plural converters, wherein the horn has an attaching flange for fixing the ultrasonic sealing apparatus to the sealing jaw and the attaching flange which becomes the fixing position of the ultrasonic sealing apparatus and the sealing jaw is a nodal plane closer to the sealing face. Such arrangements make possible an elongated uniform heat seal, while at the same time provide ultrasonic sealing apparatuses that are compact and able to output large power, and can be set on the sealing jaw of a transverse sealing apparatus of a filling/packing machine.

Stated another way, the present invention relates to an ultrasonic sealing apparatus, comprising at least one horn having an elongated sealing face for sealing a packing material and plural converters erected on a side opposite to the sealing face of the horn, which resonates the horn, and the length of the ultrasonic sealing apparatus is a length of one wavelength and its fixing position to the sealing jaw is a nodal plane.

Additionally, the present invention relates to the above-mentioned ultrasonic sealing apparatus wherein the ultrasonic sealing apparatus has one or more fixtures erected on a side opposite to the sealing face of the horn for fixing the ultrasonic sealing apparatus to the sealing jaw wherein the fixing position of the ultrasonic sealing apparatus and the sealing jaw in the fixtures is a nodal plane farther from the sealing face.

Further, the present invention relates to the above-mentioned ultrasonic sealing apparatus wherein the fixture has a receiving face of attachment for fixing the ultrasonic sealing apparatus to the sealing jaw, and the receiving face of attachment which becomes the fixing position of the ultrasonic sealing apparatus and the sealing jaw is a nodal plane farther from the sealing face.

Further, the present invention relates to the above-mentioned ultrasonic sealing apparatus wherein the fixture has a female screw portion for fixing the ultrasonic sealing apparatus to the sealing jaw using a screw connection.

Further, the present invention relates to the above-mentioned ultrasonic sealing apparatus wherein the fixture has a collar for fixing the ultrasonic sealing apparatus to the sealing jaw, and the collar which becomes the fixing position of the ultrasonic sealing apparatus and the sealing jaw is a nodal plane farther from the sealing face.

Further, the present invention relates to the above-mentioned ultrasonic sealing apparatus wherein the fixture has a screw portion to be fixed to the horn using a screw connection.

Further, the present invention relates to the above-mentioned ultrasonic sealing apparatus wherein the fixture is formed uninterruptedly with the horn.

Further, the present invention relates to the above-mentioned ultrasonic sealing apparatus wherein the horn has an attaching flange for fixing the ultrasonic sealing apparatus to the sealing jaw, and the attaching flange which becomes the fixing position of the ultrasonic sealing apparatus and the sealing jaw on the horn is a nodal plane closer to the sealing face.

Further, the present invention relates to the above-mentioned ultrasonic sealing apparatus wherein the horn has a slot and/or slit to reduce unwanted vibrations.

Further, the present invention relates to the above-mentioned ultrasonic sealing apparatus wherein the horn is made of a material having a sonic speed for longitudinal waves at or below 4,000 m/s.

Further, the present invention relates to the above-mentioned ultrasonic sealing apparatus wherein the material having a sonic speed for longitudinal waves at or below 4,000 m/s is a copper alloy.

Further, the present invention relates to the above-mentioned ultrasonic sealing apparatus wherein the copper alloy is phosphorous bronze.

Further, the present invention relates to the above-mentioned ultrasonic sealing apparatus wherein the converter has a screw portion to be fixed to the horn or to the fixture using screw connection.

Further, the present invention relates to the above-mentioned ultrasonic sealing apparatus wherein the plural converters have a control means in order to obtain a uniform and suitably strong seal at the sealing face.

Further, the present invention relates to the above-mentioned ultrasonic sealing apparatus wherein the screw connection is a screw connection using a stud bolt.

Further, the present invention relates to the above-mentioned ultrasonic sealing apparatus wherein the sealing face has a ridge in the longitudinal direction of the sealing face successively or intermittently.

Further, the present invention relates to the above-mentioned ultrasonic sealing apparatus wherein the frequency ranges from 20 KHz to 60 KHz.

Further, the present invention relates to the above-mentioned ultrasonic sealing apparatus wherein the frequency is 40 KHz.

Further, the present invention relates to the above-mentioned ultrasonic sealing apparatus, which includes a plurality of the above-mentioned ultrasonic sealing apparatuses.

Still further, the present invention relates to a transverse sealing apparatus comprising the above-mentioned ultrasonic sealing apparatus and the sealing jaw to which the ultrasonic sealing apparatus is fixed and a driving means for the sealing jaw.

Further, the present invention relates to the above-mentioned transverse sealing apparatus wherein the sealing jaw has a damper member for the horn.

The ultrasonic sealing apparatus of the present invention comprises at least one horn having an elongated sealing face for sealing a packing material and plural converters erected on a side opposite to the sealing face of the horn which resonate the horn, and which is characterized in that the length of the ultrasonic sealing apparatus is a length of one wavelength and whose fixing position to the sealing jaw is a nodal plane. And more particularly this ultrasonic sealing apparatus is characterized in that it comprises one horn having an elongated sealing face for sealing a packing material, plural converters erected on the horn and one or more fixtures provided in parallel to, the converters, wherein the converters resonating the horn or the; fixture fixing the ultrasonic sealing apparatus to the sealing jaw forms the length of one wavelength with the horn, and the fixing position of the ultrasonic sealing apparatus and the sealing jaw in the fixture is a nodal plane farther from the sealing face. And generally, the ultrasonic sealing apparatus of the invention is fixed on a sealing jaw of a transverse sealing apparatus of a filling/packing machine for heat sealing a packing material. According to a further aspect of the invention, the transverse sealing apparatus of the present invention comprises an ultrasonic sealing apparatus, a sealing jaw to which the ultrasonic sealing apparatus is fixed, and a driving means for the sealing jaw.

Any tabular material may be used as the packing material in the present invention, so long as the material can be formed into a container or the like, and the materials have a heat-welding layer such as polyethylene on at least one of front and back sides of a paper or a barrier resin as well as materials having an intermediate layer such as aluminum foil and an adhesive layer on said one side. For example, a packing material web for a filling and packing container of a juice or the like, is composed as a heat-welding layer such as polyethylene provided on the outermost layer surface of front and back faces of a paper which is a base material, and a barrier layer or an adhesive layer and the like of an intermediate layer of aluminum foil or barrier resin is provided as the need arises. Usually a thickness of 170 to 900 $\mu$m is adopted for the thickness of the web. Additionally, it is necessary to use materials which can welded by ultrasound for the innermost layer surface contacting the liquid content.

The ultrasonic sealing apparatus of the invention is, an apparatus capable of heat-sealing by heat dissolving and applying pressure by converting an electrical vibration frequency of 20 kHz or higher into a mechanical vibration, delivering an ultrasonic vibration to a heat adhesive part from the resonator which is called a horn, for generating a high frictional heat on the border surface. With a motional amplitude of approximately 15 to 70 $\mu$m and a vibration frequency of approximately 20,000 to 60,000 times per second, heat is generated in an extremely short time. Thus, an ultrasonic heat-sealing may be regarded as sealing by internal heat as well as sealing using high-frequency.

Any horn may be used as the horn of the ultrasonic sealing apparatus in the present invention, so long as it is able to weld sealing layers of the packing material with each other by transmitting ultrasonic vibrations. An exemplary horn includes an elongated sealing face provided on its tip, a curved portion having a curved shape such as a tapered shape, exponential shape or hanging-down shape toward the sealing face, and a flat face portion on a side opposite to the sealing face. On the flat face portion on the side opposite to the sealing face, plural converters and one or more fixtures are erected. Further, it is possible to form the horn and the fixtures uninterruptedly on which uninterrupted body plural converters may be erected. On the other hand, on the sealing face of the horn or the anvil, it is possible to provide a ridge having a round or rectangular shape in its section in the longitudinal direction of the sealing face continuously or intermittently.

Additionally it is desirable to use a horn having a slot (a penetrated and elongated hole provided in the direction of thickness) and/or slit (an elongated groove provided in the longitudinal direction) to reduce unwanted vibrations. And generally the slot is provided below the converters and the fixtures, while the slit is provided below between the converters, or below and between the converters and the fixtures. Also in the present invention, it is possible to provide an attaching flange on the horn for fixing the ultrasonic sealing apparatus to the sealing jaw. It is also possible to make the attaching flange as a fixing position of the ultrasonic sealing apparatus and the sealing jaw, and as a nodal plane closer to the sealing face.

As a horn material, it is possible to utilize ceramics in addition to, metals or alloys such as copper alloys, aluminum or aluminum alloys, titanium or titanium alloys. And when the frequency is fixed, as the length of the horn is in proportion to the sonic speed of the material, from the viewpoint of making an ultrasonic sealing apparatus with smaller dimension, it is desirable to use a horn material having a slow sonic speed of longitudinal waves, for example, of 4,000 m/s or lower. Exemplary materials having a sonic speed of longitudinal waves of 4,000 m/s or lower include copper alloys such as phosphorous bronze (3,360 m/s), beryllium bronze (3,780 m/s) and Nepal brass (3,240 m/s), or piezoelectric ceramic materials PZT (3,000 m/s) may be utilized. In addition, depending on the structure of the transverse sealing apparatus, or in the case that downsizing the apparatus is not required, light metals or light metal alloys and the like whose sonic speed of longitudinal waves is 4,000 m/s and above, such as aluminum or aluminum alloys, titanium or titanium alloys and the like, may also be used as the need arises.

As mentioned above, the horn is used to apply pressure by pressing a packing material against the anvil with the sealing face provided on the tip of the horn, then to transmit vibratory energy (ultrasonic vibration) concentrated at the tip to heat the adhesive portion of the packing material, thus generating a large frictional heat on the border surface with which the adhesive portion is dissolved by heat. The packing material is thus heat-sealed in cooperation with pressure. While the structure and materials of the anvil are not specially limited, the anvil may by made of, for example, a stainless steel material.

Any converter, including electrostrictive and magnetostrictive, may be used for the converters in an ultrasonic sealing apparatus of the present invention, so long as the converter converts the electrical vibration of the vibratory generator to a mechanical vibration and resonates the horn; however, an electrostrictive converter is preferable. In such case, an electrostrictive piezoelectric element using ceramic materials is desirable. Converters of this kind convert the supplied voltage to a mechanical strain, the energy of which strain is supplied to the horn as ultrasonic vibrations. In the ultrasonic sealing apparatus of the present invention, it is necessary to provide plural converters, preferably 2 to 5 converters, in order to obtain an excellent seal.

Converters in the present invention are erected on the side of the horn opposite to the sealing face of the horn. This is achieved by fixing the converters to a flat face portion on the side opposite to the sealing face of the horn or to the flat face portion of the fixture which is fixed to the flat face portion, or by fixing the converters to the flat face portion of the fixture which is formed uninterruptedly with the horn. This fixing may be done by any fixing means so long as it fixes the horn to the converters firmly, while in order to make an ultrasonic sealing apparatus of the present invention with smaller dimension, it is desirable to fix the converters on the horn by a screw connection, specifically by using a stud bolt, for which a female bolt portion is provided on the horn side of the converters.

Further, each converter is connected to a power supply of alternating current and it is desirable to provide a control means in order to transmit the vibratory energy from the plural converters uniformly to the sealing face of the horn in order to obtain a seal with uniform and suitable strength on the sealing face. Without a control means, the vibration becomes non-uniform and there is a possibility that a seal with uniform and suitable strength on the sealing face will not be, obtained. The control means may be implemented by a balancing transformer as described in Japanese Laid-Open Patent Application No. 128237/1998.

Any fixture may be used in the ultrasonic sealing apparatus in the present invention so long as it fixes the ultrasonic sealing apparatus to the sealing jaw whereby the fixing position, or the vicinity of the fixing position, of the ultrasonic sealing apparatus and the sealing jaw forms a nodal plane farther from the sealing face, and one or more of them are erected on the side opposite to the sealing face of the horn, for example, on the flat face portion of the opposite side. When applied to a transverse sealing apparatus of a filling/packing machine, it is necessary that the ultrasonic sealing apparatus be attached and fixed to the sealing jaw in a compact manner. Accordingly, it is preferable to attach compactly by means of a screw connection using a stud bolt or the like, which is described in the following, rather than fixing the ultrasonic sealing apparatus by providing a flange on the sealing jaw and using the same. On the other hand, for fixing the fixture with the horn, it is preferable to fix compactly by means of a screw connection using a stud bolt and the like. Additionally, it is also possible to form the fixture and the horn together uninterruptedly as aforementioned, or fix a formed body in which a plurality of erected fixtures are coupled in their lower parts to the above-mentioned flat face portion of the horn by screw connection using a stud bolt and the like. The cross-sectional form of the fixture in the present invention may be exemplified as a round or rectangular shape.

Fixing the ultrasonic sealing apparatus to the sealing jaw can be achieved, for example, at the end portion of the fixture on the side opposite to the horn or at the center portion of the fixture. When fixed at the end portion of the fixture on the side opposite to the horn, an attachment method such as stud attachment and the like for fixing the ultrasonic sealing apparatus to the sealing jaw is used, for which a female screw portion is used as a fixture. In this case, a female screw portion hole is provided so that a receiving face of the attachment which becomes the fixing position in the fixture is a nodal plane farther from the sealing face. Also, when fixed at the central portion of the fixture, the ultrasonic sealing apparatus is fixed to the sealing jaw by properly coupling a collar provided at the central portion of the fixture with the sealing jaw. In this case, the position of the collar is determined so that the collar-provided portion becomes a nodal plane farther from the sealing face. Further, fixing the ultrasonic sealing apparatus to the sealing jaw, as aforementioned, is achieved by providing an attaching flange on the horn for fixing the ultrasonic sealing apparatus to the sealing jaw. In this case, this attaching flange becomes a fixing position of the ultrasonic sealing apparatus and the sealing jaw as well as a nodal plane closer to the fixing position.

The position of the nodal plane can be set precisely by a vibration analysis and the like using a computer at the stage of designing fixtures or horns.

In an ultrasonic sealing apparatus of the present invention, there exist two nodal planes because the entire length of the apparatus is constituted of one wavelength of the vibrating frequency. The ultrasonic sealing apparatus of the present invention is characterized in that either nodal plane of the two nodal planes present, one being closer to and the other farther from the sealing face, becomes the fixing position of the ultrasonic sealing apparatus and the sealing jaw. Additionally, when the nodal plane farther from the sealing face becomes the fixing position, it, is preferable to provide a damper member at the side frame of the sealing jaw, using the nodal plane closer to the sealing face, for preventing the horn of the ultrasonic sealing apparatus, which is rotating at a high speed, from swinging, and for making the sealing face of the horn butt precisely to the position of a packing material to be sealed.

Further, the ultrasonic sealing is performed at a frequency of 20 KHz to 60 KHz, preferably at 40 KHz with the general output at the extent of 2 KW, while the entire length of the apparatus including the converters or the fixture and the horn is set to correspond to the length of one wavelength. In such case, the amplitude at the sealing face of the tip end portion of the horn becomes maximum so that the exothermic efficiency is enhanced, thus enlarging the sealing strength. For example, for a horn material with slow sonic speed comprising a material whose sonic speed of the longitudinal wave is 3,600 m/s at a frequency of 40 KHz, the length of one wavelength is 9 cm. In this case, the entire length of the apparatus including the converters, or the fixture and the horn is 9 cm to make the length of the converters, the fixture and the horn be 4.5 cm respectively. Therefore, when the entire length of the ultrasonic sealing apparatus is to the extent of 10 cm, it is possible to be used as a transverse sealing apparatus for the filling/packing machine of the prior art.

Moreover, when the traversing face is long as in the case of a large container and a long sealing surface is required, it is possible to enlarge the sealing face by connecting a plurality of the above described ultrasonic sealing apparatuses. Additionally, an ultrasonic sealing apparatus of the present invention may or may not have a booster which is used to amplify the amplitude.

BEST MODES TO CARRY OUT THE INVENTION

Figure 1:
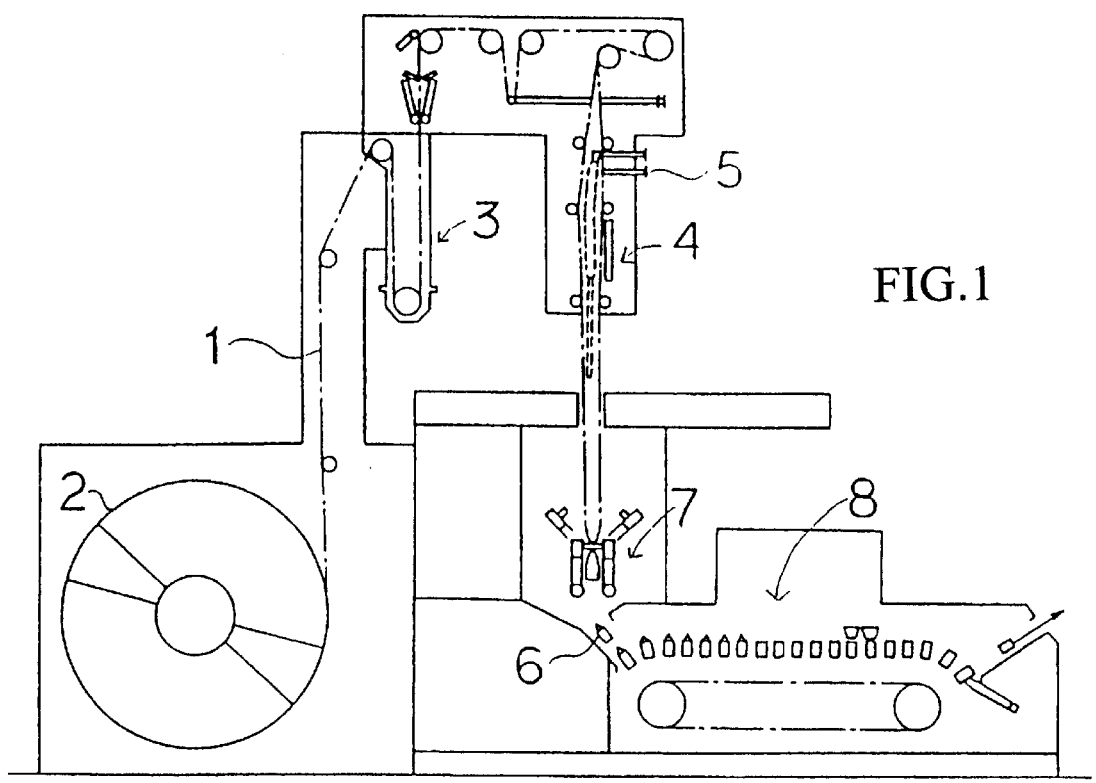
FIG. 1 is an entire view of the filling/packing machine in which an ultrasonic sealing apparatus of the present invention is applied.

The preferable examples of embodiments of an ultrasonic sealing apparatus of the present invention are described according to the drawings in the following, while the present invention is not limited to the description in the drawings.

Figure 2:
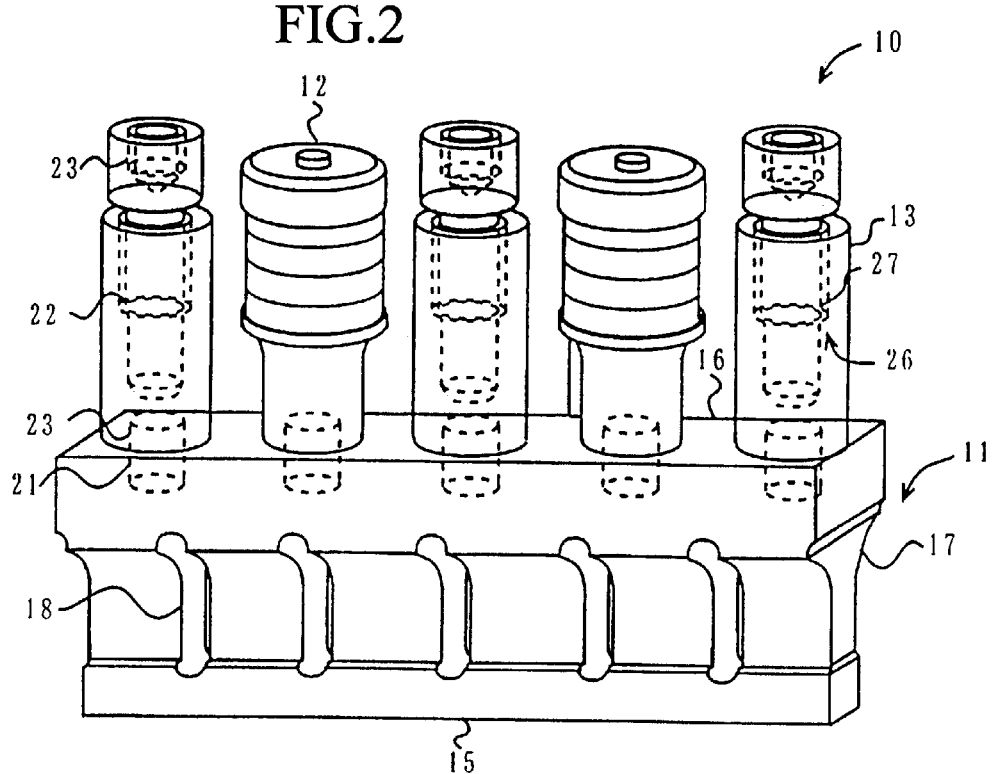
FIG. 2 is a schematic perspective view of an ultrasonic sealing apparatus of the present invention.

FIG. 2 is a schematic perspective view of an ultrasonic sealing apparatus 10 of the present invention. Additionally, in FIG. 2 to FIGS. 9, 10 shows an which includes a horn 11; a converter 12; a fixture 13; a horn-fixture uninterruptedly formed body 14; a sealing face 15 of the horn 11; a flat face 16 of the horn 11; a curved portion 17 of the horn 11; a slot 18; a slit 19; a collar 20; a stud bolt 21; a receiving face 22 of stud attachment; a female screw portion 23; a sealing jaw 24; a damper fixing 25; a nodal plane 26; a stud attachment 27; and an attaching flange 28, respectively.

With reference to FIG. 2, the ultrasonic sealing apparatus 10 of the present invention is shown in which two converters 12 and three fixtures 13 are erected on the horn 11 having the sealing face 15, the flat face 16, the curved portion 17 and the slot 18. In this apparatus 10, the female screw portion 23 for fixing the apparatus to the horn 11 using a stud bolt 21 is provided on the converters 12 and the fixtures 13. Also, the female screw portion 23 for fixing the apparatus with the sealing jaw using a stud attachment 27 is provided on the fixtures 13.

Figure 3:
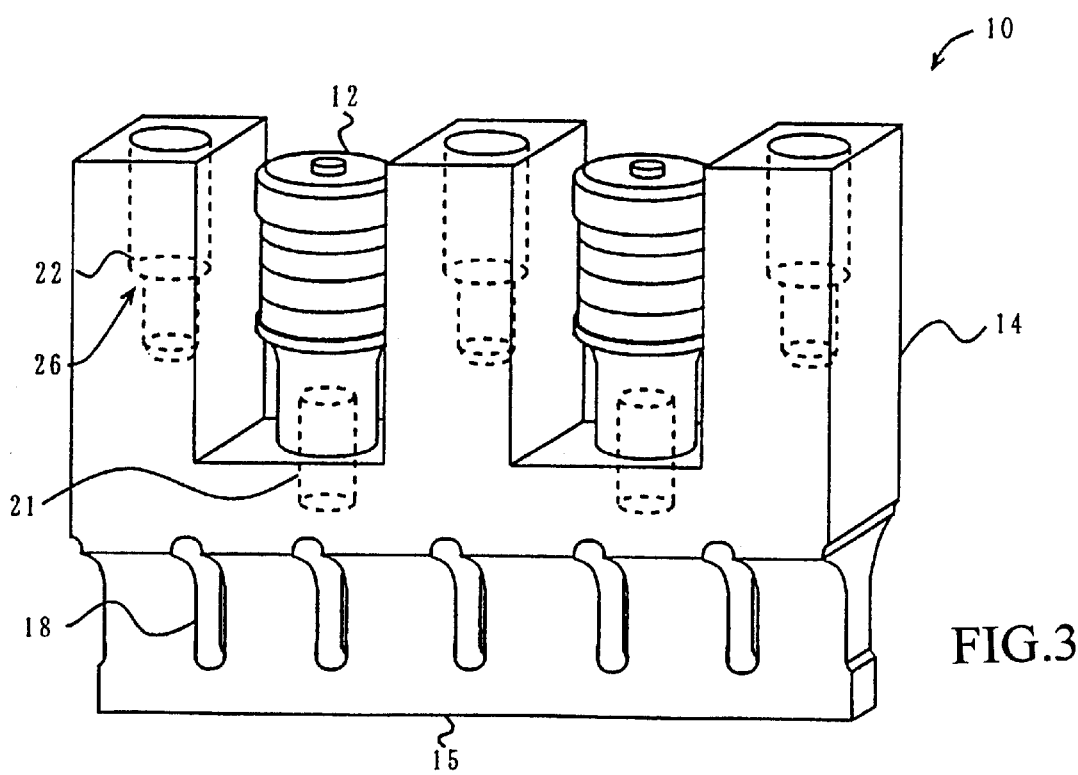
FIG. 3 is a schematic perspective view of an ultrasonic sealing apparatus of another mode of the present invention.

FIG. 3 shows an ultrasonic sealing apparatus 10 of the present invention in which two converters 12 are erected on the horn-fixture uninterruptedly formed body 14 by forming the horn 11 and the fixtures 13 together uninterruptedly. In this apparatus 10, likewise the apparatus 10 shown in FIG. 2, the receiving face of stud attachment 22 becomes an attaching position constituting a nodal plane 26 farther from the sealing face 15.

Figure 4:
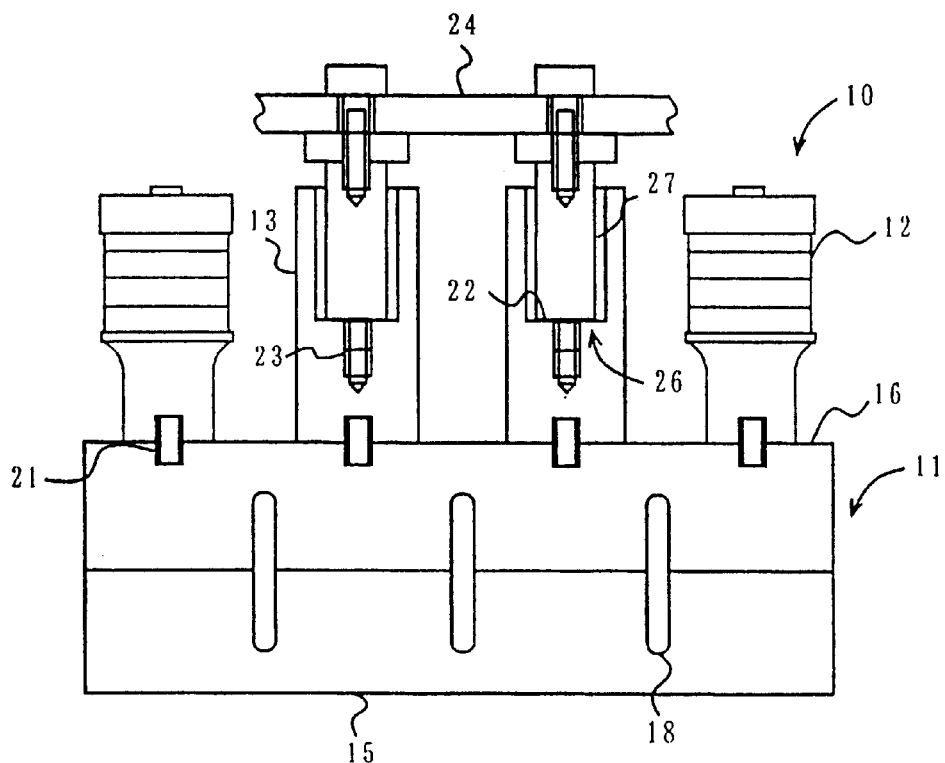
FIG. 4 is a schematic front view of an ultrasonic sealing apparatus of another mode of the present invention.

FIG. 4 shows an ultrasonic sealing apparatus 10 of the present invention in which two fixtures 13 are erected next to the horn 11 between two converters 12 at both exterior sides, by which two fixtures 13, the ultrasonic sealing apparatus 10 is fixed to the sealing jaw 24 and also in this case, the receiving face of stud attachment 22 is a nodal plane 26 farther from the sealing face 15.

Figure 5:
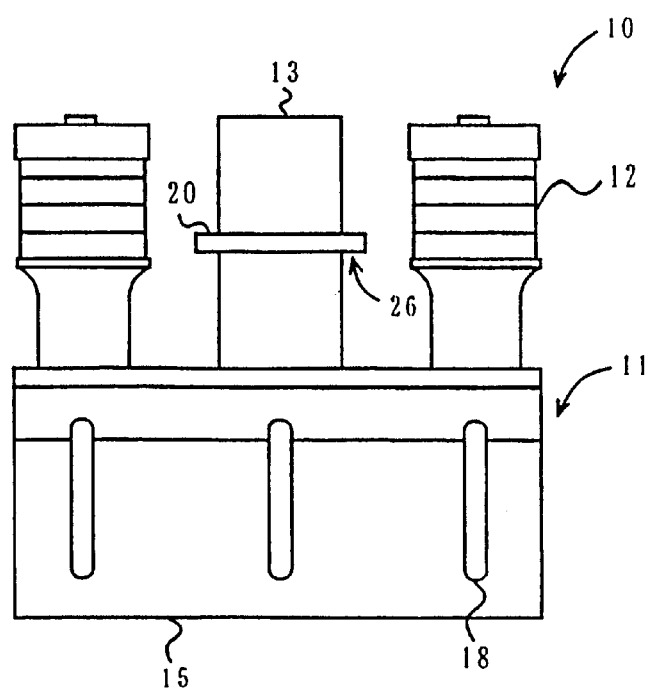
FIG. 5 is a schematic front view of an ultrasonic sealing apparatus of another mode of the present invention.

FIG. 5 shows an ultrasonic sealing apparatus 10 of the present invention in which one fixture 13 is erected next to the horn 11 between two converters 12 at both exterior sides and in this apparatus 10, the collar 20 provided at the center portion of the fixtures 13 to fix the apparatus to the sealing jaw 24 becomes an attaching position and a nodal plane 26 farther from the sealing face 15.

Figure 6:
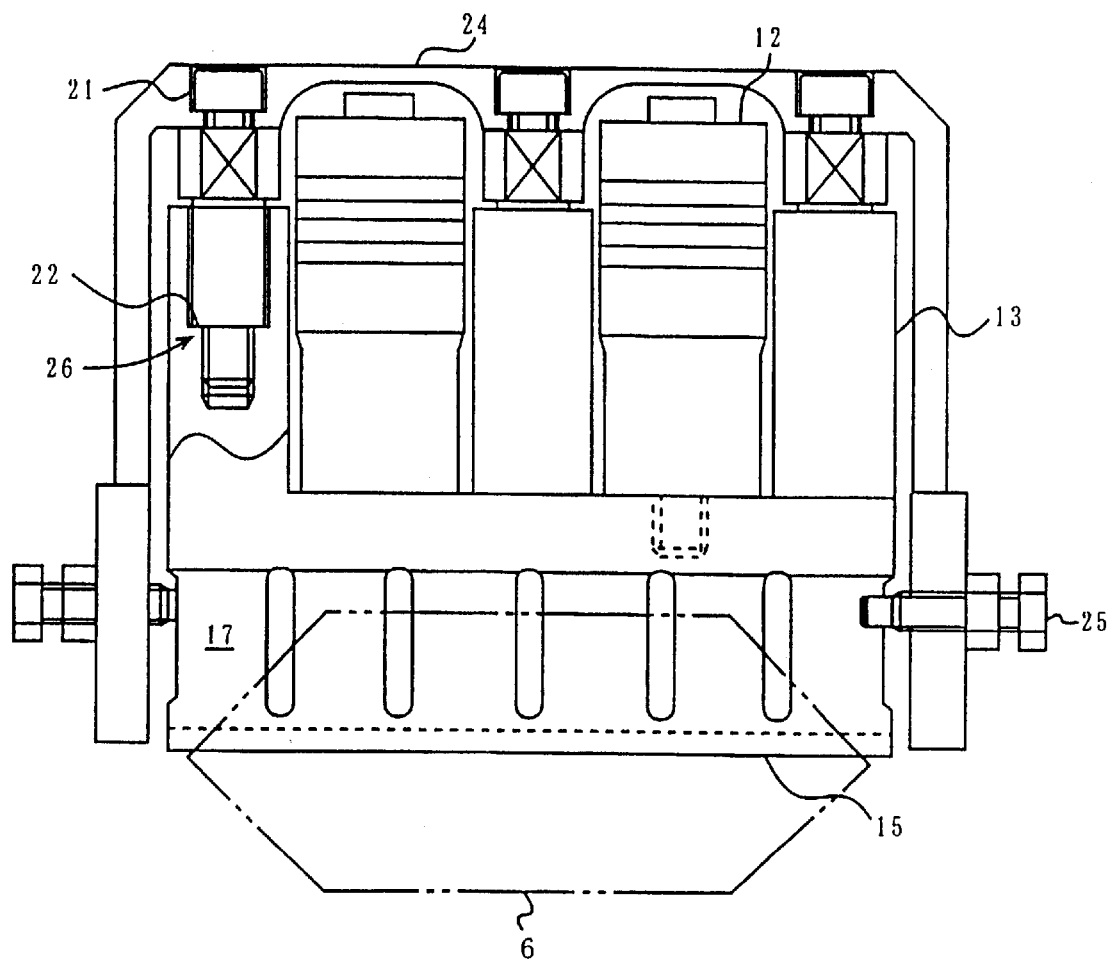
FIG. 6 is a schematic front view of an ultrasonic sealing apparatus of the present invention shown in FIG. 2.

FIG. 6 shows a state in which the ultrasonic sealing apparatus 10 shown in FIG. 2 is fixed to the sealing jaw 24 and a hexagonal-holed bolt 21 which can be embedded in the sealing jaw 24 is used for fixing the fixtures 13. Further aforementioned, also in this case the receiving face 22 of stud attachment 27 becomes the fixing position and a nodal plane 26 farther from the sealing face 15. Also, the damper fixing bolt 25 is provided on the side frame of the sealing jaw 24, to prevent the horn from swinging at the curved portion 17 of the horn which becomes a nodal plane closer to the sealing face 15. FIG. 6 also shows the pillow-shaped container 6 which is to be sealed.

Figure 7:
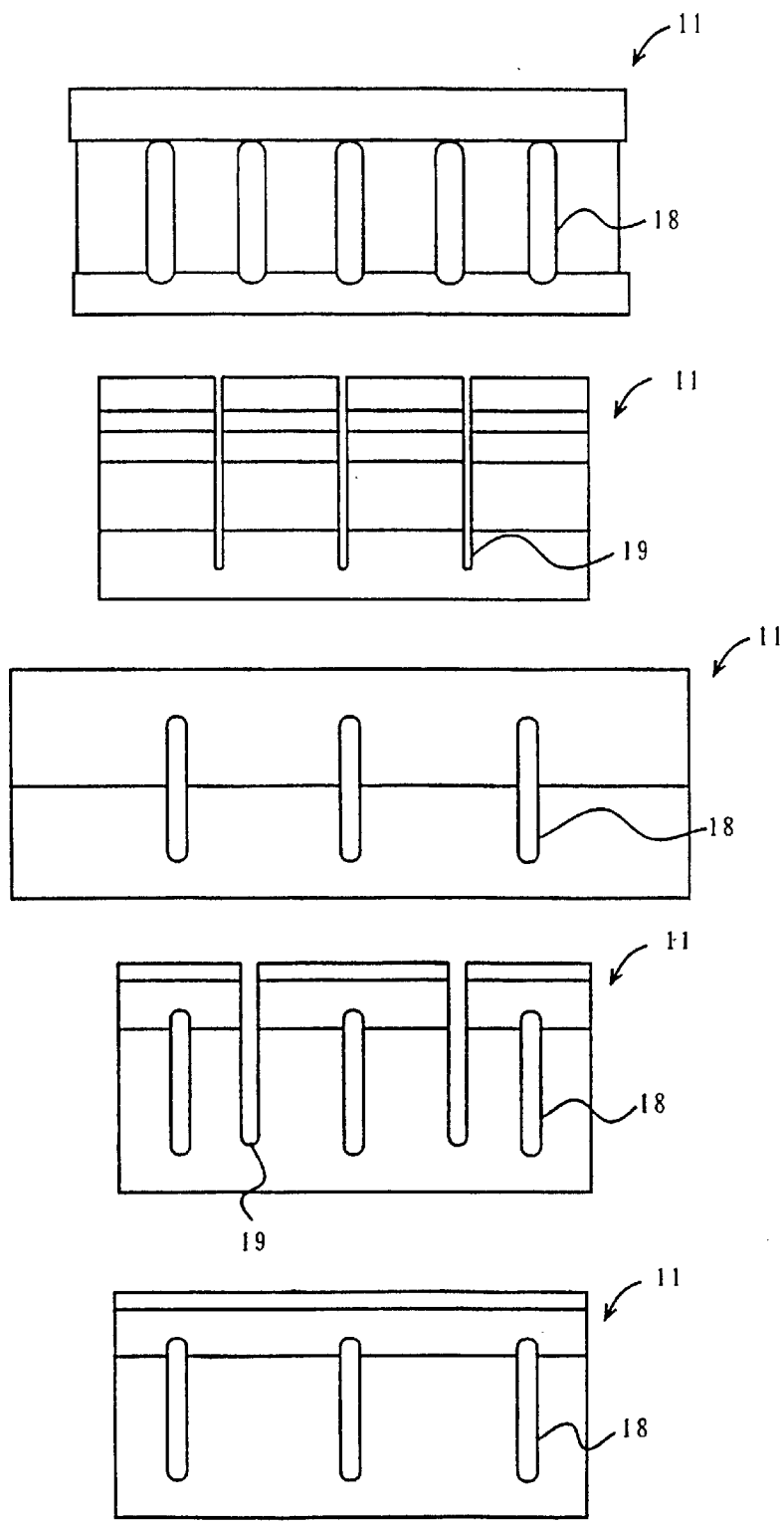
FIG. 7 is a schematic front view of horns of various shapes in an ultrasonic sealing apparatus of the present invention.
Figure 8:
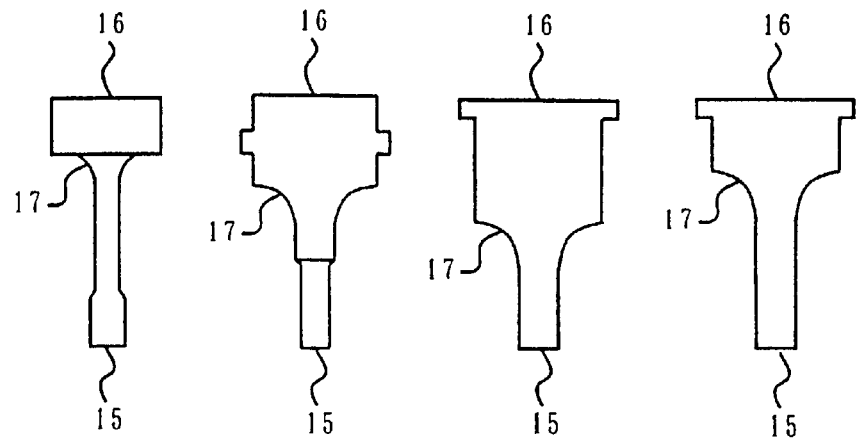
FIG. 8 is a schematic side view of horns of various shapes in an ultrasonic sealing apparatus of the present invention.

Additionally, FIGS. 7 and 8 show the horns 17 of various shapes having the sealing face 15, the flat face portion 16 and the curved portion 17, and the slot 18 or the slit 19.

Figure 9:
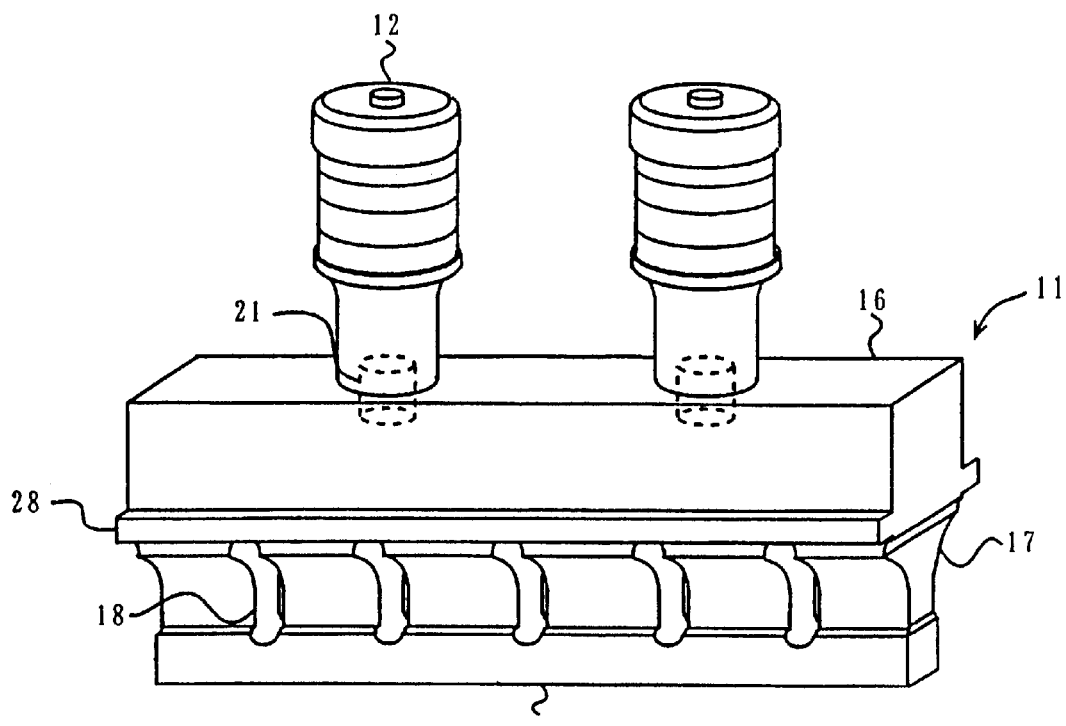
FIG. 9 is a schematic perspective view of an ultrasonic sealing apparatus of another mode of the present invention.

FIG. 9 shows the ultrasonic sealing apparatus in which the attaching flange for fixing the ultrasonic sealing apparatus to the sealing jaw is provided on the horn. In this case, the attaching flange becomes the fixing position of the ultrasonic sealing apparatus and a nodal plane closer to the sealing face.

Industrial Applicability

The present invention makes it possible to provide a smaller ultrasonic sealing apparatus with larger pressure power and enhanced sealing capability compared to the ultrasonic sealing apparatuses of the prior art, and furthermore is capable of uniformly sealing an elongated sealing face.

What is claimed is:

1. An ultrasonic sealing apparatus, comprising:

at least one horn having an elongated sealing face for sealing a packing material: and plural converters erected on a side of the horn opposite to the sealing face for resonating the horn with a vibrating frequency, wherein the ultrasonic sealing apparatus has a length that is one wavelength of the vibrating frequency and which is fixed in position to a sealing jaw at a nodal plane of the vibrating frequency.

2. The ultrasonic sealing apparatus according to claim 1, including at least one fixture erected on a side opposite to the sealing face of the horn for fixing the ultrasonic sealing apparatus to the sealing jaw, and the fixing position of the ultrasonic sealing apparatus and the sealing jaw is a nodal plane remote from the sealing face.

3. The ultrasonic sealing apparatus according to claim 2, wherein the fixture has a receiving face of attachment for fixing the ultrasonic sealing apparatus to the sealing jaw, and the receiving face of attachment which becomes the fixing position of the ultrasonic sealing apparatus and the sealing jaw is a nodal plane remote from the sealing face.

4. The ultrasonic sealing apparatus according to claim 2, wherein the fixture has a female screw portion for fixing the ultrasonic sealing apparatus to the sealing jaw using a screw connection.

5. The ultrasonic sealing apparatus according to claim 2, wherein the fixture has a collar for fixing the ultrasonic sealing apparatus to the sealing jaw, the collar constituting the fixing position of the ultrasonic sealing apparatus and the sealing jaw and being at a nodal a plane remote from the sealing face.

6. The ultrasonic sealing apparatus according to claim 2, wherein the fixture has a screw portion fixable to the horn using a screw connection.

7. The ultrasonic sealing apparatus according to claim 2, wherein the fixture is formed uninterruptedly with the horn.

8. The ultrasonic sealing apparatus according to claim 1, wherein the horn has an attaching flange for fixing the ultrasonic sealing apparatus to the sealing jaw, the attaching flange constituting the fixing position of the ultrasonic sealing apparatus and the sealing jaw on the horn and being at a nodal plane close to the sealing face.

9. The ultrasonic sealing apparatus according to claim 1, wherein the horn includes at least one of a slot and a slit to reduce unwanted vibrations.

10. The ultrasonic sealing apparatus according to claim 1, wherein the horn comprises a material having a longitudinal wave sonic speed of 4,000 m/s or less.

11. The ultrasonic sealing apparatus according to claim 10, wherein the material comprises a copper alloy.

12. The ultrasonic sealing apparatus according to claim 11, wherein the copper alloy comprises phosphorous bronze.

13. The ultrasonic sealing apparatus according to claim 2, wherein the converter has a screw portion to be fixed to one of the horn and the fixture using a screw connection.

14. The ultrasonic sealing apparatus according to claim 1, further comprising a control means for controlling the converters to produce a uniform and strong seal at the sealing face.

15. The ultrasonic sealing apparatus according, to claim 4, wherein the screw connection is a screw comprises a stud bolt.

16. The ultrasonic sealing apparatus according to claim 1, wherein the sealing face is a sealing face having a ridge in the longitudinal direction of the sealing face successively or intermittently.

17. The ultrasonic sealing apparatus according to claim 1, wherein the frequency ranges from 20 KHz to 60 KHz.

18. The ultrasonic sealing apparatus according to claim 17, wherein the frequency is 40 KHz.

19. An ultrasonic sealing device comprising a plurality of ultrasonic apparatuses each according to claim 1.

20. A transverse sealing apparatus comprising in combination the ultrasonic sealing apparatus according to claim 1 and a sealing jaw to which the ultrasonic sealing apparatus is fixed with a driving means for driving the sealing jaw.

21. The transverse sealing apparatus according to claim 20, wherein the sealing jaw includes a damper member for the horn.

22. The ultrasonic sealing apparatus according to claim 6, wherein the screw connection comprises a stud bolt.

23. The ultrasonic sealing apparatus according to claim 13, wherein the screw connection comprises a stud bolt.

* * * * *